US009151451B2

(12) United States Patent
Yang et al.

(10) Patent No.: US 9,151,451 B2

(45) Date of Patent: Oct. 6, 2015

(54) LED BULB AND LAMP HEAD ASSEMBLY WITH POSITIONING STRUCTURES

(71) Applicant: Amphenol LTW Technology Co., Ltd., New Taipei (TW)

(72) Inventors: Chih-Huan Yang, New Taipei (TW); Alan Michael Jamisolamin Sundo, New Taipei (TW)

(73) Assignee: AMPHENOL LTW TECHNOLOGY CO., LTD., New Taipei (TW)

( * ) Notice: Subject to any disclaimer, the term of this patent is extended or adjusted under 35 U.S.C. 154(b) by 135 days.

(21) Appl. No.: 14/022,038

(22) Filed: Sep. 9, 2013

(65) Prior Publication Data

US 2015/0070908 A1 Mar. 12, 2015

(51) Int. Cl.

| | |
|---|---|
| ***H01R 33/00*** | (2006.01) |
| ***B60Q 3/04*** | (2006.01) |
| ***F21V 15/00*** | (2015.01) |
| ***H01R 13/66*** | (2006.01) |
| ***H01R 33/02*** | (2006.01) |
| ***H01R 33/08*** | (2006.01) |
| ***F21K 99/00*** | (2010.01) |
| ***H01R 33/09*** | (2006.01) |
| ***H01R 33/22*** | (2006.01) |
| *F21V 23/02* | (2006.01) |
| *F21Y 101/02* | (2006.01) |

(52) U.S. Cl.

CPC .............. *F21K 9/1355* (2013.01); *H01R 33/09* (2013.01); *H01R 33/22* (2013.01); *F21V 23/02* (2013.01); *F21Y 2101/02* (2013.01)

(58) Field of Classification Search

CPC .... H01R 33/94; H01R 2201/08; H01R 33/22; H01R 33/225; H01R 13/6658; F21V 19/001; F21V 19/003; F21V 19/006; F21V 19/0045; F21K 9/1355

USPC .......... 362/362, 650, 800; 439/615, 236, 611, 439/620.02

See application file for complete search history.

(56) References Cited

U.S. PATENT DOCUMENTS

| | | | | |
|---|---|---|---|---|
| 7,033,220 | B1 * | 4/2006 | Yang | 439/617 |
| 7,965,023 | B1 * | 6/2011 | Liang | 313/45 |
| 8,421,321 | B2 * | 4/2013 | Chuang | 313/46 |
| 8,963,410 | B2 * | 2/2015 | Wu | 313/318.01 |
| 2011/0028015 | A1 * | 2/2011 | Mostoller et al. | 439/280 |
| 2012/0275170 | A1 * | 11/2012 | Li et al. | 362/373 |
| 2012/0314422 | A1 * | 12/2012 | Dong et al. | 362/311.02 |
| 2013/0070464 | A1 * | 3/2013 | Shinohara et al. | 362/373 |
| 2013/0100674 | A1 * | 4/2013 | Kim et al. | 362/249.14 |
| 2013/0128573 | A1 * | 5/2013 | Leung et al. | 362/235 |
| 2013/0221829 | A1 * | 8/2013 | Kitagawa et al. | 313/110 |
| 2014/0078753 | A1 * | 3/2014 | Araki | 362/373 |
| 2014/0126220 | A1 * | 5/2014 | Chen et al. | 362/311.02 |

* cited by examiner

*Primary Examiner* — Jong-Suk (James) Lee
*Assistant Examiner* — Erin Kryukova
(74) *Attorney, Agent, or Firm* — Chun-Ming Shih; HDLS IPR Services

(57) ABSTRACT

The present invention provides a lamp head assembly with positioning structures for combining with a lamp base. The lamp head assembly includes a conducting head and a supporting barrel. The conducting head has an insulating seat, a first conducting plate and a second conducting plate and a conduction piece. The conduction piece is electrically connected with the first conducting plate. A portion of the second conducting plate is protruded out of the insulating seat, and an end of the insulating seat is formed with a inserting plate. The supporting barrel includes a supporting section connected and an assembling section; wherein, the supporting barrel is assembled on the conducting head through a positioning of the inserting plate and the slot.

8 Claims, 7 Drawing Sheets

1

LED BULB AND LAMP HEAD ASSEMBLY WITH POSITIONING STRUCTURES

BACKGROUND OF THE INVENTION

1. Field of the Invention

The present invention generally relates to a lamp head assembly and, in particular to a lamp head assembly used in an LED bulb.

2. Description of Related Art

Because LEDs have characteristics of quick response, small size and low pollution etc., LEDs are gradually replaced incandescent lamps for saving energy and protecting environment.

Commercially available LED bulb has a lamp base and a lamp head connecting with the lamp base. There is an LED assembly disposed in the lamp base, and a conducting threaded section and an electrically bump are provided on the lamp head. Moreover, two wires are accommodated in the lamp base. An end of one wire is soldered on the circuit board, and the other end is soldered on a conducting threaded section. Besides, an end of the other wire is soldered on the circuit board and the other end is soldered on the electrically bump for configuring as a circuit loop.

However, an electrically connection of the above LED bulb is achieved through a soldering process. According to the soldering process is complicated, the operating time and the assembly cost will be increased. Furthermore, the soldering joints for the electrically connection will be detached easily, and an electrically connection will not be completed when the LED bulb shakes or vibrates. As LED bulbs have a variety of models, then various kinds of structures of lamp bases and lamp heads are performed. Therefore, a long development time and the high cost of the product are resulted.

In view of the above drawbacks, the Inventor proposes the present invention based on his expert knowledge and elaborate researches in order to solve the problems of related art.

SUMMARY OF THE INVENTION

Accordingly, an object of the present invention is to provide a lamp head assembly with positioning structures, the conducting head corresponding to the supporting barrel will not slip and loose in the horizontal direction, and a stable combination will be achieved.

Another object of the present invention is to provide a lamp head assembly with positioning structures, the conducting head and the supporting barrel can be provided separately for different types of LED bulbs. Thus the development time will be shortened, and the production cost will be reduced.

In order to achieve the object mentioned above, the present invention provides a lamp head assembly with positioning structures for combining with a lamp base. The lamp head assembly includes a conducting head and a supporting barrel. The conducting head has an insulating seat, a first conducting plate and a second conducting plate separately disposed in the insulating seat and a conduction piece. The conduction piece is protruded out of the insulating seat and electrically connected with the first conducting plate. A portion of the second conducting plate is protruded out of the insulating seat, and an end of the insulating seat is formed with at least one inserting plate. The supporting barrel includes a supporting section connected with the lamp seat and an assembling section extended from the supporting section. An outer surface of the supporting section is provided with a plural of threads, and the assembling section has a slot corresponding to the inserting plate; wherein, the supporting barrel is assembled on the conducting head through a positioning of the inserting plate and the slot.

Comparing to the related art, the conducting head of the lamp head assembly with positioning structures of the present invention is provided a inserting plate, and the supporting barrel is provided with a slot correspondingly. The conducting head and the supporting barrel are assembled with each other through a positioning of the inserting plate and the slot. Thus the conducting head corresponding to the supporting barrel will not slip and loosen in the horizontal direction, and a stable combination will be achieved. Moreover, the conducting head and supporting barrel can be provided separately for different types of LED bulbs. Thus the development time will be shortened, and the production cost will be reduced.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
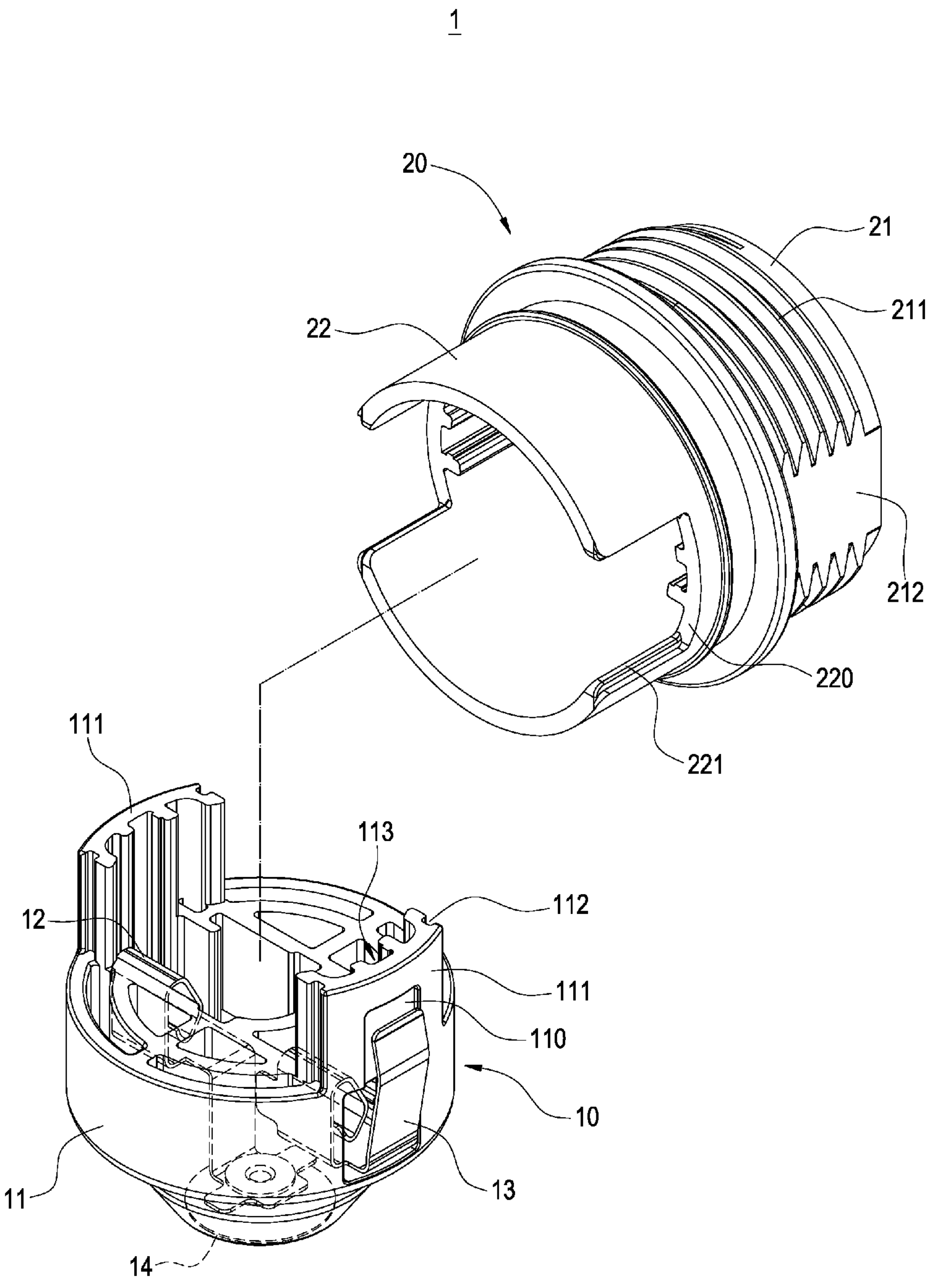
FIG. 1 is a perspective explosion schematic view of a lamp head assembly with positioning structures of the present invention.

Please refer to FIG. 1, it depicts a perspective explosion schematic view of a lamp head assembly with positioning structures of the present invention. The lamp head assembly 1 includes a conducting head 10 and a supporting barrel 20. The supporting barrel 20 is inserted on the conducting head 10 and aligned each other. Thus the supporting barrel 20 corresponding to the conducting head 10 will not loosen in the horizontal direction. The detail structures will be described later.

The conducting head 10 includes an insulating seat 11, a first conducting plate 12, a conduction piece 14 and a second conducting plate 13 disposed separately in the insulating seat 11. The conduction piece 14 is protruded out of the insulating seat 11 and electrically connected with the first conducting plate 12. A portion of the second conducting plate 13 is protruded out of the insulating seat 11, and an end of the insulating seat 11 is formed with at least one inserting plate 111.

In the present embodiment, the conduction piece 14 is a rivet, and the conduction piece 14 is inserted in the first conducting plate 12 and protruded out of the insulating seat 11. Besides, a side of the insulating seat 11 is provided with a trough 110, and a portion of the trough 110 is located on the inserting plate 111. Furthermore, one end of the second conducting plate 13 is bent and protruded out of the trough 110.

The supporting barrel 20 includes a supporting section 21 connected with the lamp base 2 and an assembling section 22 extended from the supporting section 21. An outer surface of the supporting section 21 is provided with a plural of threads 211 and formed with a positioning plane 212. The assembling section 22 has a slot 220 corresponded to the inserting plate 111.

Figure 2:
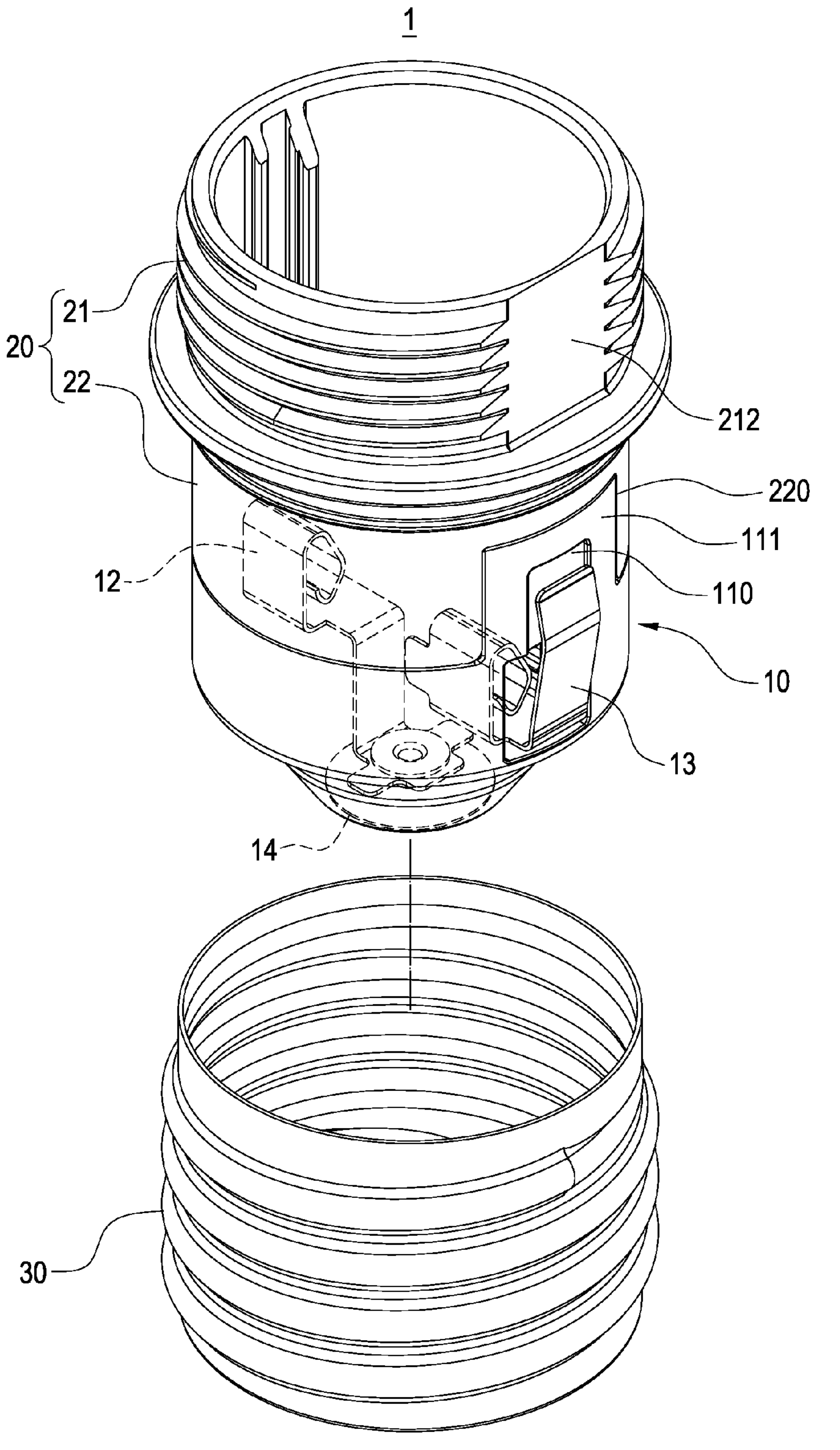
FIG. 2 is an assembly schematic view of a lamp head assembly with positioning structures of the present invention.

With refer to FIG. 2, it depicts an assembly schematic view of a lamp head assembly with positioning structures of the present invention. In an embodiment of the present invention, the lamp head assembly 1 further includes a conducting ring 30. A periphery of the conducting ring 30 is formed in a wave shape. Moreover, the conducting ring 30 is sleeved outside the conducting head 10 and conducted with the second conducting plate 13.

Figure 3:
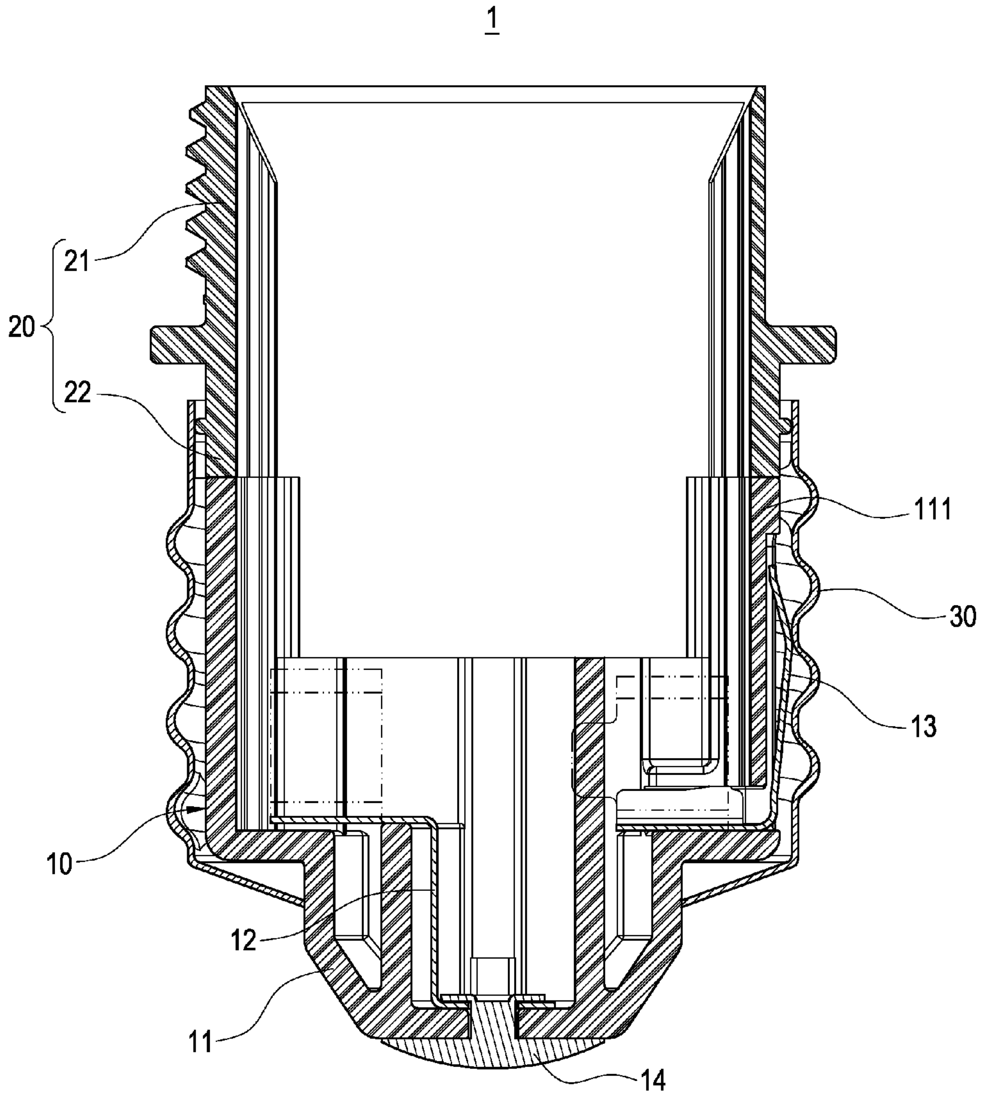
FIG. 3 is an assembly cross sectional views of one side of a lamp head assembly with positioning structures of the present invention.
Figure 4:
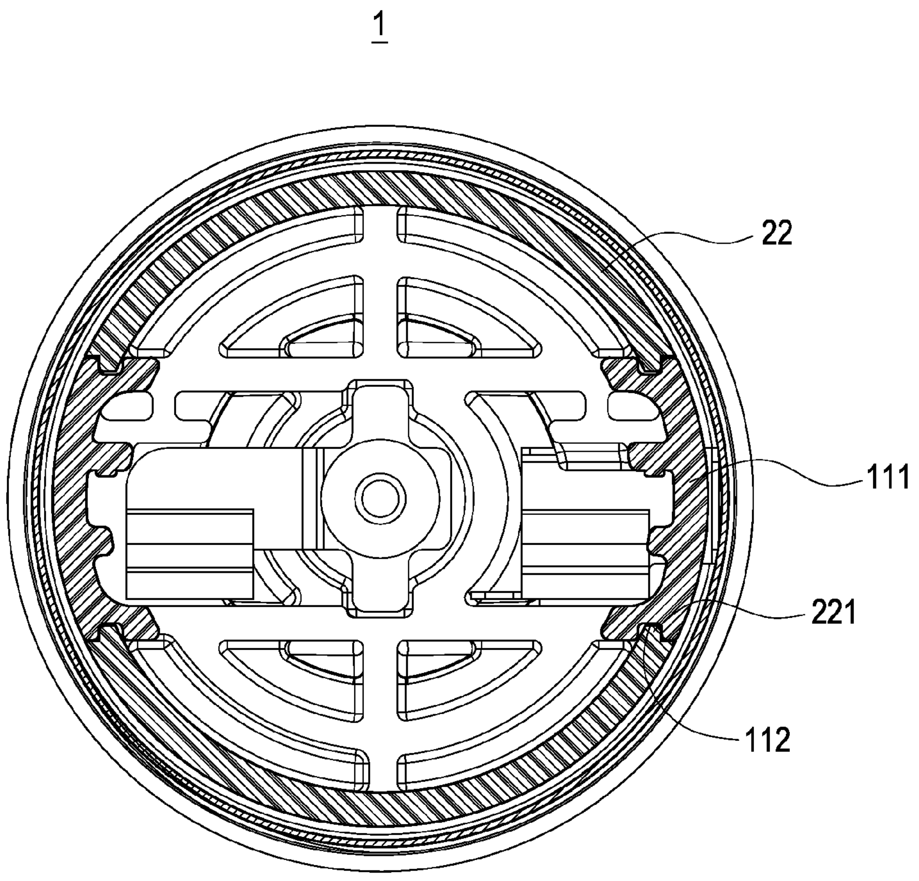
FIG. 4 is an assembly cross sectional views of another side of a lamp head assembly with positioning structures of the present invention.

Please also refer to FIG. 3 and FIG. 4, they depict two assembly cross sectional views of two sides of a lamp head assembly with positioning structures of the present invention. The assembly structures of the conducting head 10 and the supporting barrel 20 are more detail described later. In the present invention, a lateral side of the inserting plate 111 of the conducting head 10 is provided with a sliding slot 112. The assembling section 22 of the barrel has a rib 221 located on a side of the sliding slot 112 correspondingly, and the rib 221 is inserted in the sliding slot 112. Thus, the supporting barrel 20 is assembled on the conducting head 10 through the positioning of the slot 220 and the inserting plate 111, and then the conducting head 10 and the supporting barrel 20 will not be shifted in the horizontal direction after combination.

Figure 5:
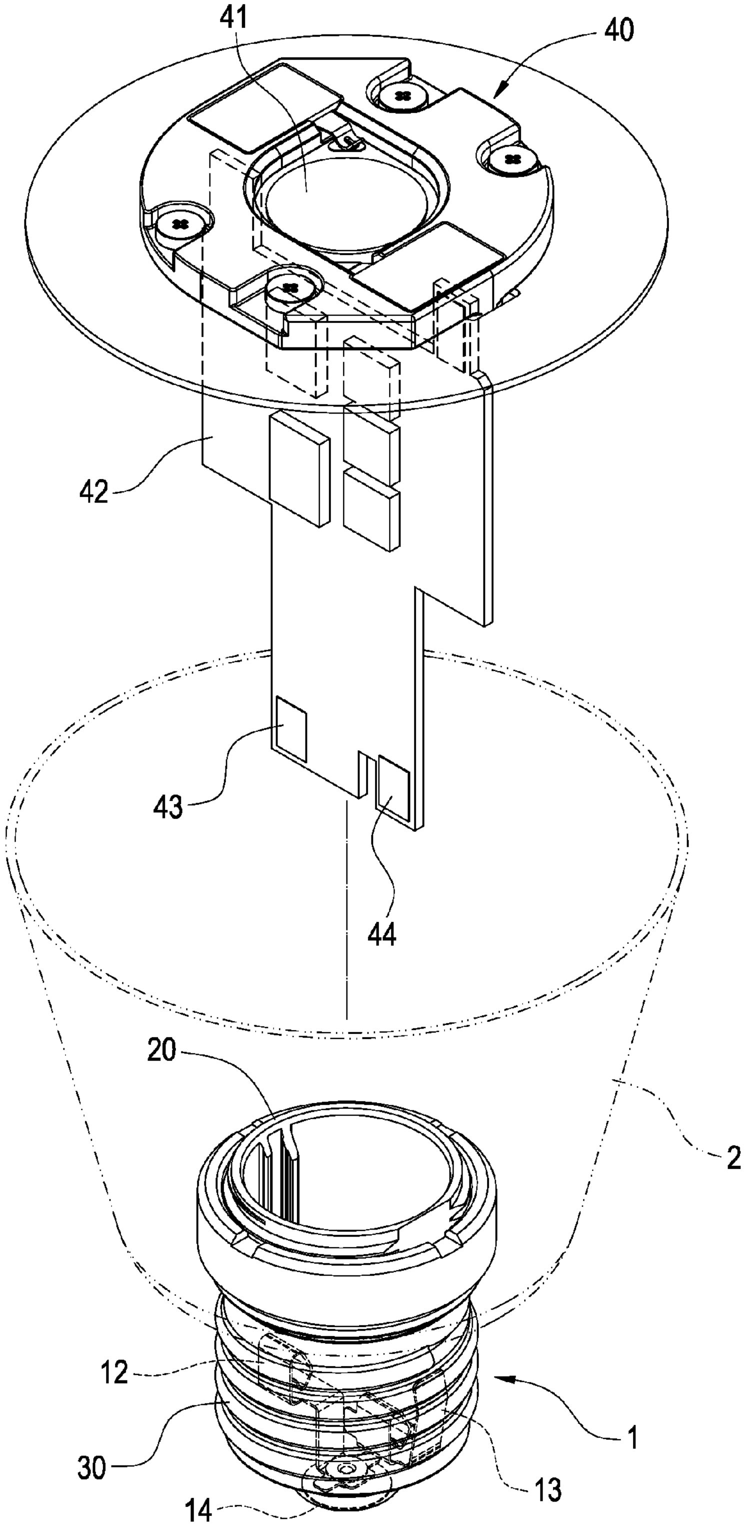
FIG. 5 is a partial explosion view of an LED lamp of the present invention.
Figure 6:
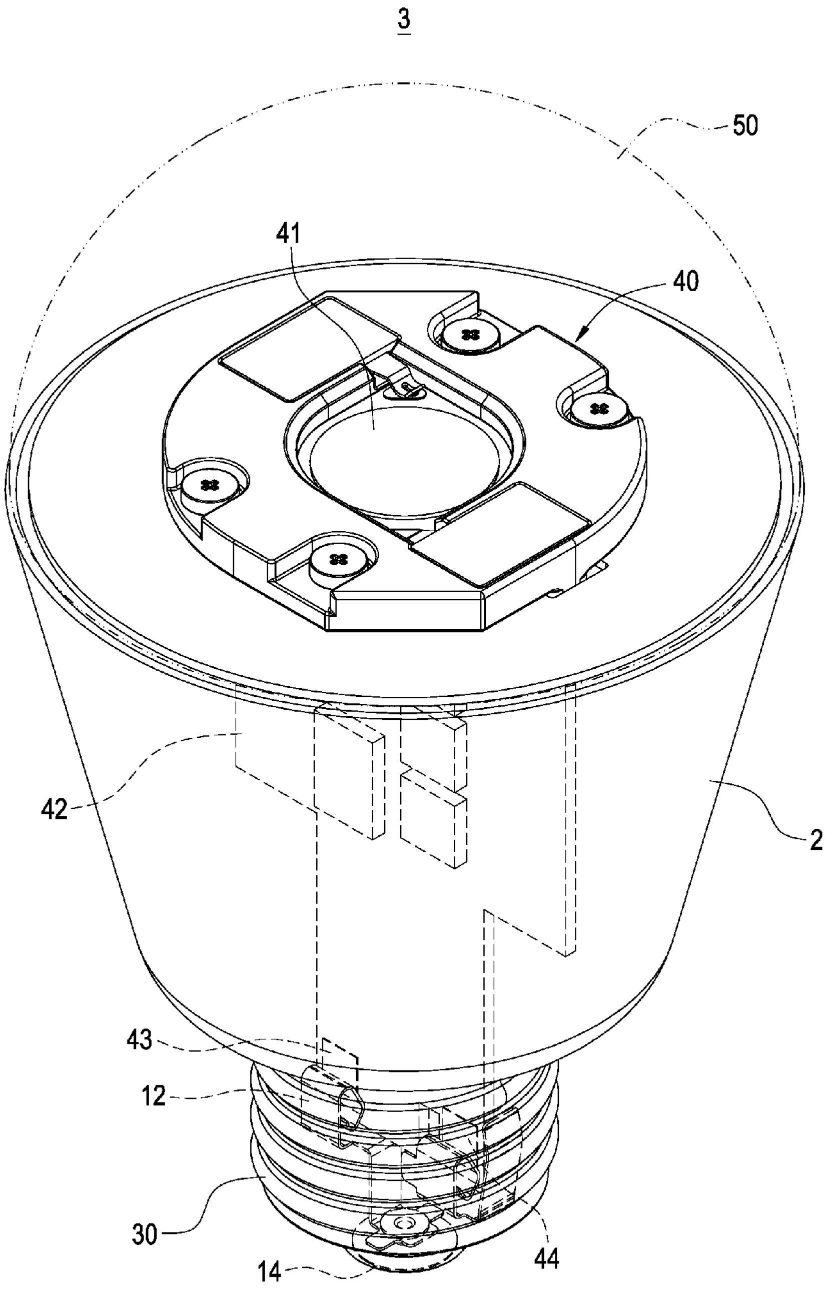
FIG. 6 is a perspective schematic view of an LED lamp of the present invention.
Figure 7:
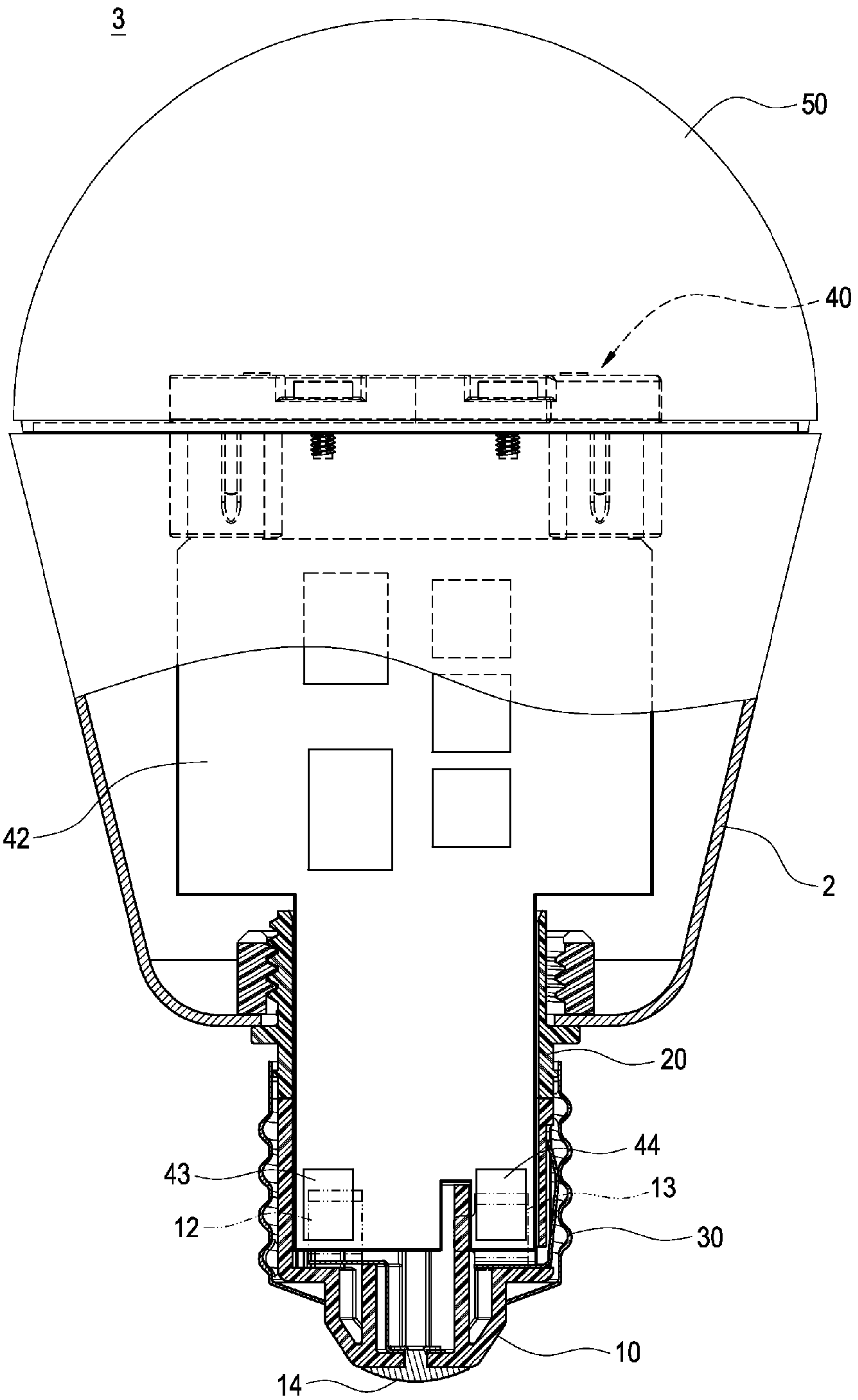
FIG. 7 is an assembly cross sectional view of an LED lamp of the present invention.

Please also refer to FIG. 5 to FIG. 7, they depict partial explosion view, perspective schematic view and assembled cross sectional view of an LED lamp of the present invention. The lamp head assembly 1 with positioning structures of the present invention is used to combine with a lamp base 2 for constructing an LED bulb 3.

In an embodiment of the present invention, the LED bulb 3 includes a lamp head assembly 1, a lamp base 2, a lighting module 40 and a lamp shell 50. The lamp head assembly 1 includes a conducting head 10 and a supporting barrel 20, and the structures of the lamp head assembly 1 are as described above. The lamp base 2 assembled on the supporting barrel 20 could be provided as a heat sink, and the lighting module 40 is disposed in the lamp base 2.

The lighting module 40 includes an LED assembly 41, a circuit board 42 electrically connected with the LED assembly 41, and a first conducting pad 43 and a second conducting pad 44 disposed on the circuit board 42. The lamp shell 50 is a transparent shell, and the lamp shell 50 is disposed on the lamp base 2 for covering the LED assembly 41.

In the present embodiment, an inner surface of the inserting plate 111 of the conducting head 10 is provided with a plural of grooves 113 (refer to FIG. 1), and two sides of the circuit board 42 are inserted in the grooves 113. Then the first conducting pad 43 of the circuit board 42 is electrically connected with the first conducting plate 12, and the second conducting pad 44 is electrically connected with the second conducting plate 13. In this way, the circuit board 42 will be assembled on the lamp base 2 and the electrically connection will be achieved.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A lamp head assembly with positioning structures for combining with a lamp base, the lamp head assembly comprising:

a conducting head including an insulating seat, a first conducting plate, a conduction piece, and a second conducting plate disposed separately in the insulating seat, the conduction piece protruded out of the insulating seat and electrically connected with the first conducting plate, a portion of the second conducting plate protruded out of the insulating seat, and an end of the insulating seat formed with at least one inserting plate; and a supporting barrel including a supporting section connected with the lamp base and an assembling section extended from the supporting section, an outer surface of the supporting section provided with a plurality of threads, the assembling section having a slot corresponding to the inserting plate;

wherein, the supporting barrel is assembled on the conducting head through a positioning of the inserting plate and the slot, the inserting plate has a sliding slot on a lateral side of the inserting plate, and the assembling section has a rib corresponding to the sliding slot of the inserting plate such that the rib is inserted into the sliding slot of the inserting plate when the assembling section is assembled on the conducting head.

2. The lamp head assembly according to claim 1, wherein a side of the insulating seat is provided with a trough, and one end of the second conducting plate is bent and protruded out of the trough.

3. The lamp head assembly according to claim 2, wherein a portion of the trough is located on the inserting plate.

4. The lamp head assembly according to claim 1, wherein the conduction piece is a rivet, and the conduction piece is inserted in the first conducting plate and protruded out of the insulating seat.

5. The lamp head assembly according to claim 1, further including a conducting ring, and the conducting ring is sleeved outside the conducting head and conducted with the second conducting plate.

6. The lamp head assembly according to claim 5, wherein a peripheral surface of the conducting ring is formed in a wave shape.

7. The lamp head assembly according to claim 1, wherein an outer surface of the supporting section is formed with a positioning plane.

8. An LED bulb, comprising:

a lamp head assembly, comprising:

a conducting head including an insulating seat, a first conducting plate, a conduction piece and a second conducting plate separately disposed in the insulating seat, the conduction piece protruded out of the insulating seat and electrically connected with the first conducting plate, a portion of the second conducting plate protruded out of the insulating seat, and an end of the insulating seat formed with at least one inserting plate; and a supporting barrel including a supporting section connected with a lamp base and an assembling section extended from the supporting section, an outer surface of the supporting section provided with a plurality of threads, the assembling section having a slot corresponding to the inserting plate, and the supporting barrel assembled on the conducting head through an positioning of the inserting plate and the slot, wherein the inserting plate has a sliding slot on a lateral side of the inserting plate, and the assembling section has a rib corresponding to the sliding slot of the inserting plate such that the rib is inserted into the sliding slot of the inserting plate when the assembling section is assembled on the conducting head;

the lamp base is assembled on the supporting barrel;

a lighting module disposed in the lamp base, the lighting module including an LED assembly, a circuit board electrically connected with the LED assembly and a first conducting pad and a second conducting pad disposed on the circuit board, the first conducting pad electrically connected with the first conducting plate, and the second conducting pad electrically connected with the second conducting plate; and a lamp shell disposed on the lamp base and covering the LED assembly.

* * * * *